(12) United States Patent
Yeh

(10) Patent No.: US 8,096,845 B2
(45) Date of Patent: *Jan. 17, 2012

(54) FOAM PRODUCT

(76) Inventor: Tzong In Yeh, Fremont, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/694,612

(22) Filed: Jan. 27, 2010

(65) Prior Publication Data

US 2010/0129590 A1    May 27, 2010

Related U.S. Application Data

(63) Continuation-in-part of application No. 12/071,728, filed on Feb. 26, 2008, now Pat. No. 7,670,202, and a continuation-in-part of application No. 11/717,631, filed on Mar. 14, 2007, now Pat. No. 7,416,461, and a continuation-in-part of application No. 11/271,920, filed on Nov. 14, 2005, now Pat. No. 7,201,625.

(51) Int. Cl.
*B63B 1/00* (2006.01)

(52) U.S. Cl. .......................................... 441/65; 441/74

(58) Field of Classification Search ................ 114/357; 441/65, 74
See application file for complete search history.

(56) References Cited

U.S. PATENT DOCUMENTS

| | | | | |
|---|---|---|---|---|
| 5,211,593 A * | 5/1993 | Schneider et al. | ............. | 441/65 |
| 5,275,860 A * | 1/1994 | D'Luzansky et al. | ......... | 114/357 |
| 5,503,921 A * | 4/1996 | Chang et al. | .................... | 441/74 |
| 5,647,784 A * | 7/1997 | Moran | .............. | 441/65 |
| 5,658,179 A * | 8/1997 | Glydon et al. | .................. | 441/74 |
| 7,670,202 B2 * | 3/2010 | Yeh | ................................ | 441/65 |

* cited by examiner

*Primary Examiner* — Lars A Olson
(74) *Attorney, Agent, or Firm* — Rosenberg, Klein & Lee

(57) ABSTRACT

A foam product includes a foam core, at least one elastic buffer and a foam skin. The foam core defines an area on a surface thereof. The elastic buffer has a bottom surface bonded to the area of the surface of the foam core. The foam skin has a bottom surface bonded to a top surface of the elastic buffer and other areas of the surface of the foam core. The elastic buffer is made of foam materials and is elastic than the foam core. Additionally, the elastic buffer causes a bulge in the first foam skin.

16 Claims, 6 Drawing Sheets

FOAM PRODUCT

CROSS REFERENCE TO RELATED APPLICATION

This is a continuation-in-part of U.S. patent application Ser. No. 12/071,728, filed on Feb. 26, 2008, which is a continuation-in-part of U.S. patent application Ser. No. 11/717,631, filed on Mar. 14, 2007, now issued as U.S. Pat. No. 7,416,461, which is a continuation-in-part of U.S. patent application Ser. No. 11/271,920, filed on Nov. 14, 2005, now issued as U.S. Pat. No. 7,201,625.

BACKGROUND OF INVENTION

1. Field of Invention

The present invention relates to a foam product in particular to a foam product with at least one elastic buffer locally embedded in a specific area thereof.

2. Related Prior Art

A conventional foam product comprises a foam core and a skin encasing the foam core. The foam core is made of foam materials. The skin is bonded to the foam core via a bonding medium.

In U.S. Pat. Nos. 5,658,179 and 4,850,913, a sports board comprises a foam core and a film/foam sheet laminate covering the foam core. The foam core is composed of foam materials and shaped into a predetermined figure. The laminate is heat-laminated to all the surfaces of the foam core.

U.S. Pat. No. 5,211,593 discloses a foam-core structure with a graphics-imprinted skin. The foam-core structure and the method for making the same are similar with those of the patents mentioned above, but more complicated.

Additionally, U.S. Pat. No. 4,767,369 discloses a water ski including a core and an outer skin enveloping the core. The water skin further includes struts positioned between a top surface of the core and the outer skin. The struts traverse a longitudinal portion of the ski and provide for two primary functions. First, they provide structural integrity to support foot bindings. Second, they provide torsional rigidity to the ski.

SUMMARY OF INVENTION

The primary object of this invention is to provide a foam product embedded with an elastic foam buffer against external force.

According to the present invention, a foam product includes a foam core, at least one elastic buffer and a foam skin. The elastic buffer is made of foam materials and has a bottom surface bonded to a surface of the foam core. The foam skin has a bottom surface bonded to a top surface of the elastic buffer and the surface of the foam core. In addition, the elastic buffer causes a bulge in the first foam skin.

Preferably, the foam product further comprises a plastic film, a second foam skin and a plastic board. The first plastic film has a pattern visible from outside and a bottom surface bonded to a top surface of the first foam skin. The second foam skin has a top surface bonded to a bottom surface of the foam core. The plastic board has a top surface bonded to a bottom surface of the second foam skin and is thicker than the plastic film.

Further benefits and advantages of the present invention will become clear as the description proceeds.

BRIEF DESCRIPTION OF DRAWINGS

The invention will now be elucidated with reference to the following description and accompanying drawings where.

DETAILED DESCRIPTION OF PREFERRED EMBODIMENT

With reference to FIGS. 1-4, description will be given of a foam product according to a first embodiment of this invention. The foam product described herein is a bodyboard. However, the foam product according to another embodiment of this invention may also be applied for many other applications, such as sports goods, recreational equipments, cushion, etc. For instance, the foam product may be used in sports goods, e.g. a snowboard, a sailboard, a paddle board or a slider. Alternatively, the foam product may be applied to other cushion, e.g. a bicycle saddle or a luggage cushion.

Figure 1:
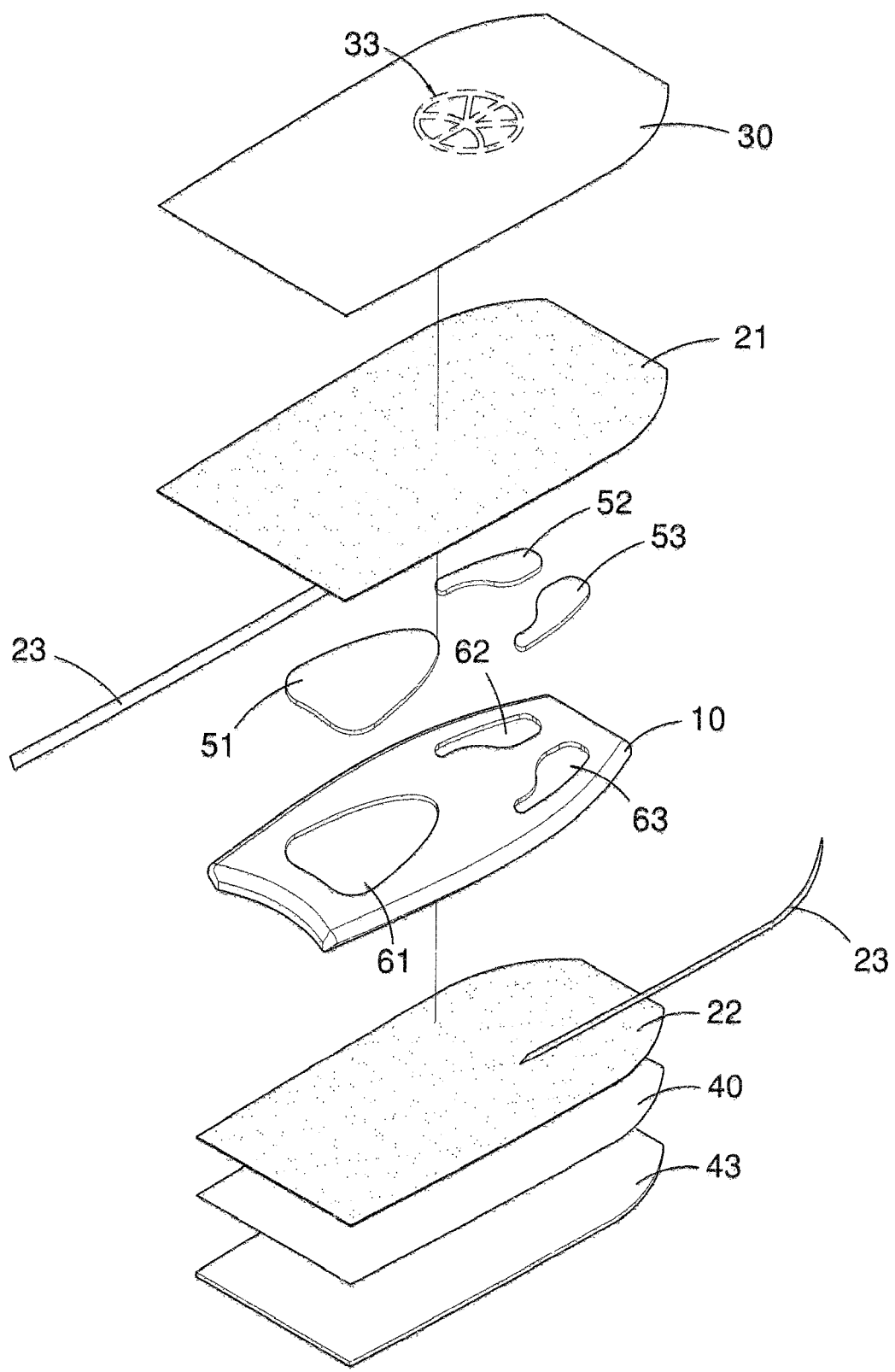
FIG. 1 is an explosive view of a foam product according to a first embodiment of the present invention.

Referring to FIG. 1, the foam product includes a foam core 10, a first foam skin 21, a second foam skin 22, a pair of third foam skins 23, a first plastic film 30, a plurality of shaped foam buffers 51, 52, 53 and a plastic board including a second plastic film 40 and a plastic plate 43. The plastic film 30 has a pattern 33 visible from outside.

Figure 2:
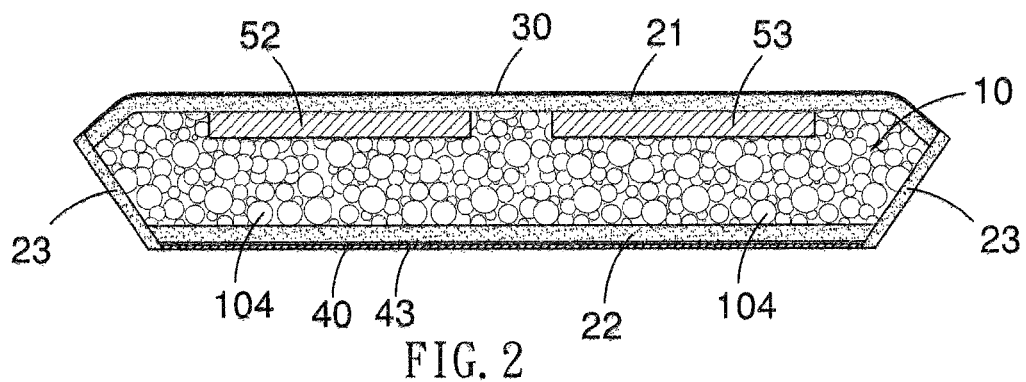
FIG. 2 is a cross-sectional view of the foam product of FIG. 1.

FIG. 2 is a cross-sectional view of the foam product. As shown in FIG. 2, the foam core 10 is composed of a plurality of foam beads 104 bonded with one another tightly. The foam beads 104 are made of foam particles, such as polypropylene (PP), polyethylene (PE), polystyrene (PS) or the like, and those foam beads 104 are pre-foamed.

Figure 3:
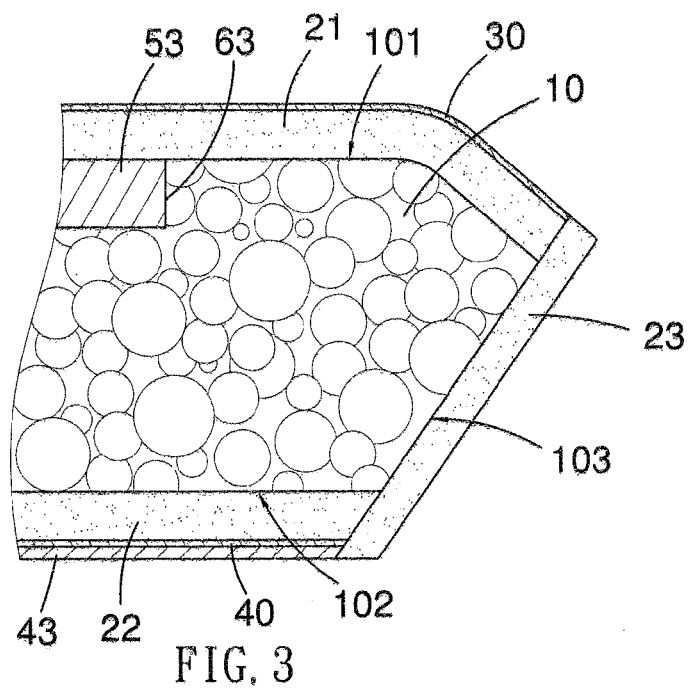
FIG. 3 is a regionally enlarged view of the foam product shown in FIG. 2.

FIG. 3, a regionally enlarged view of FIG. 2, shows that the foam core 10 has a top surface 101, a bottom surface 102 and edges 103. Three recesses 61, 62, 63 corresponding to the three foam buffers 51, 52, 53 are defined in predetermined areas of the top surface 101 of the foam core 10, where the areas are to be impacted during use with respect to other areas of the top surface 101. The foam buffers 51, 52, 53 have is more elastic that the foam core 10 and are securely received in the recesses 61, 62, 63 of the foam core 10. In other words, the foam buffers 51, 52, 53 of the present invention may be located in any suitable position on the top surface 101 of the foam cores 10 and the preferred position is where the foam product will be exerted or pressed. Each of the foam buffers 51, 52, 53 has a density greater than that of the first foam skin 21, preferably in a range of 1.5 to 12 pcf, so that the foam product is more tactile and even. Similarly, the foam buffers 51, 52, 53 may be made of PE, PP, PS, thermoplastic polyurethane elastomer (TPU) or the like. Preferably, the foam buffers 51, 52, 53 are made of materials selected from those with physical-chemical characteristics similar to those of the foam beads 104 of the foam core 10. As shown in FIG. 1, the foam buffers 51, 52, 53 are disposed on the predetermined areas of the top surface 101 of the foam core 10 where a user may touch or lie prone while surfing. In such a fashion, the foam buffers 51, 52, 53 can protect the foam core 10 from excessive stress and distortion over a long period of time so that the foam product is strong and endurable. In another example, if the foam product is used in a boat or a canoe, one or more foam buffers may need to be placed in other suitable positions so as to match up with the body of the boat or the body of the canoe.

Referring back to FIG. 2, the foam core 10 is entirely encased by the first, second and third foam skins 21, 22, 23. The foam skins 21, 22, 23 are made of the same polyethylene foam with same density and are directly heat laminated to the foam core 10 correspondingly without an intermediate element. More specifically, the first foam skin 21 is fully bonded to and entirely covers top surfaces of the foam buffers 51, 52, 53 and the other areas of the foam core 10. The second foam skin 22 is heat laminated to the bottom surface 102 of the foam core 10. Laterally opposed third foam skins 23 are laminated to the side edges 103 of the foam core 10 respectively. Since the foam buffers 51, 52, 53 are disposed in the recesses 61, 62, 63 of the foam core 10 and bonded with the foam core 10, and also is covered by and bonded with the first foam skin 21, there is no room for the foam buffers 51, 52, 53 to move. Each of the polyethylene foam skins 21, 22, 23 has a density greater than that of the foam core 10 and is in the range of 1.5 to 10 PCF. Hence the foam skins 21, 22, 23 have smoother surfaces, which improve the interfacial bonding strength during the heat lamination between the foam core 10 and the non-foam first plastic film 30.

In another example where the foam core 10 is made of non-polyethylene foam, such as polystyrene foam or polypropylene foam, and the foam skins 21, 22, 23 and the foam buffers 51, 52, 53 are made of polyethylene foam, the foam skins 21, 22, 23 and the foam buffers 51, 52, 53 are adhesively bonded to the foam core 10 via a bonding medium or an adhesive.

Figure 4:
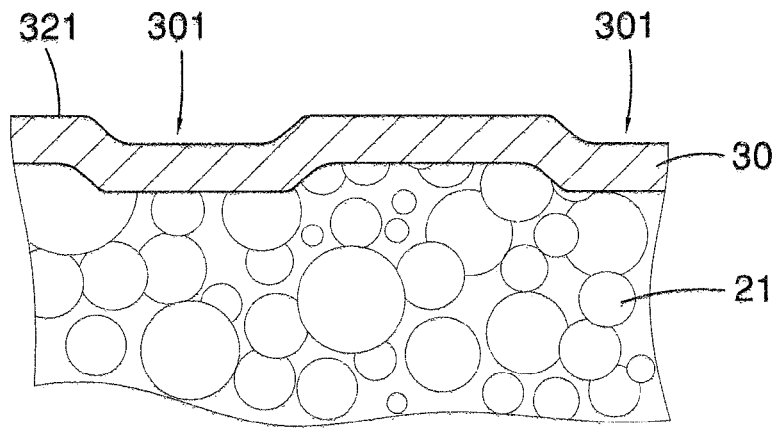
FIG. 4 is a further regionally enlarged view of the foam product shown in FIG. 3.

Referring to FIG. 4, the first plastic film 30 together with the first foam skin 21 is embossed or cast via a mold to define a plurality of concaves 301 in an exterior surface 321 of the plastic film 30. In such a manner, the bonding strength between the plastic film 30 and the foam skin 21 is enhanced. Furthermore, the concaves 301 enable the users to grab the foam product with greater tenacity.

The pattern 33 of the first plastic film 30 is disposed in an front area of the top surface of the plastic film 30. However, in other example, the pattern 33 may cover the entire top surface of the plastic film 30. Similar to the first plastic film 30, the opposed second plastic film 40 of the plastic board has a pattern. The plastic plate 43 is laminated to a bottom of the second plastic film 40 to enhance wear resistance. In addition, the plastic plate 43 are made of transparent materials so the pattern of the second plastic film 40 is visible from outside of the plastic plate 43 and is also protected from direct exposure to the outside of environment.

As stated above, the foam core 10 as well as the patterns is protected from erosion by exposure to ultraviolet light, moisture and abrasion. Furthermore, the patterns are visible from outside of the foam product that attracts the users' attentions.

In order to enhance the bonding between the foam core 10, the foam buffers 51, 52, 53 and the first foam skin 21, a bonding medium (not shown) may be either applied to a contact side of the first foam skin 21 or to the top surface 101 of the foam core 10 and sides of the foam buffers 51, 52, 53. Preferably, the bonding medium is formed on the contact side of the first foam skin 21 for bonding the first foam skin 21 to the top surface 101 of the foam core 10. The foam buffers 51, 52, 53 can further comprise additional bonding mediums to bond themselves to the foam core 10. In particular, materials of the bonding mediums are selected according to those of the foam beads 104 of the first foam core 10. In addition, the bonding mediums are made of the materials with excellent bonding ability to the foam beads 104 and the foam buffers 51, 52, 53, such as a multi-property copolymer mixed with PE, PS or the like.

Figure 5:
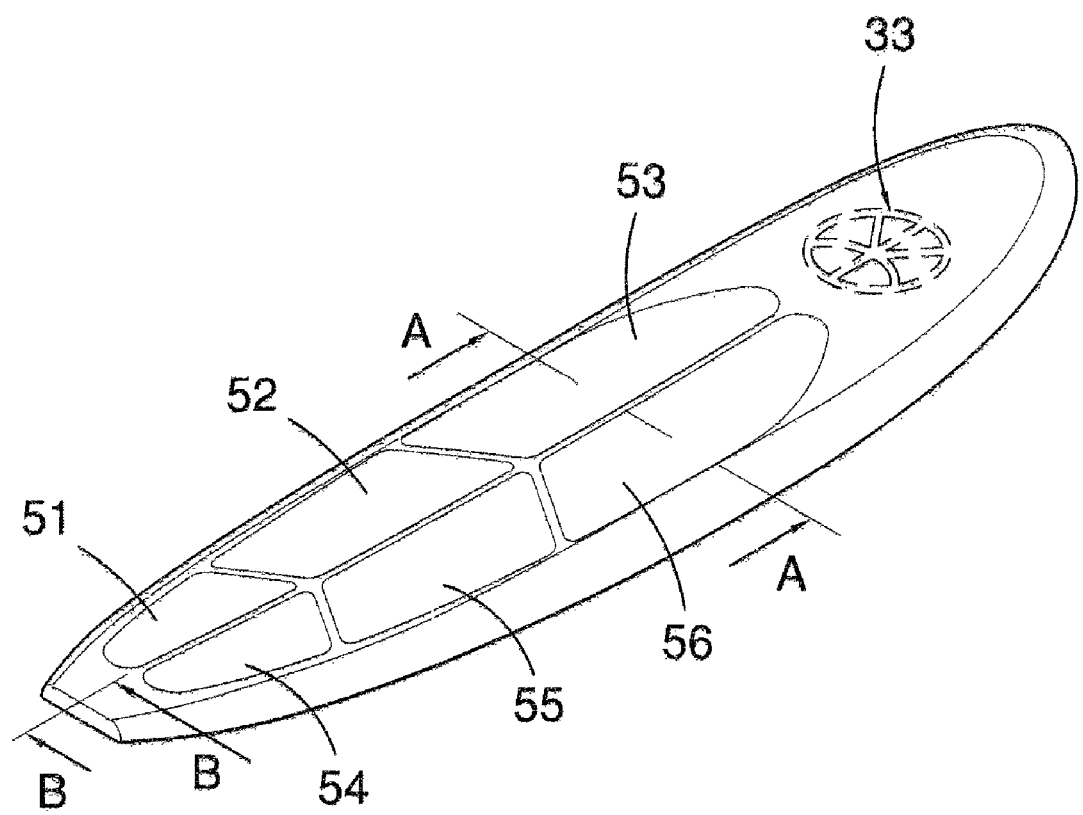
FIG. 5 is a perspective view of a foam product according to a second embodiment of the present invention.

With reference to FIGS. 5-10, description will be given of a foam product according to a second embodiment of this invention. The foam product described herein is a paddle board, as illustrated in FIG. 5.

Figure 6:
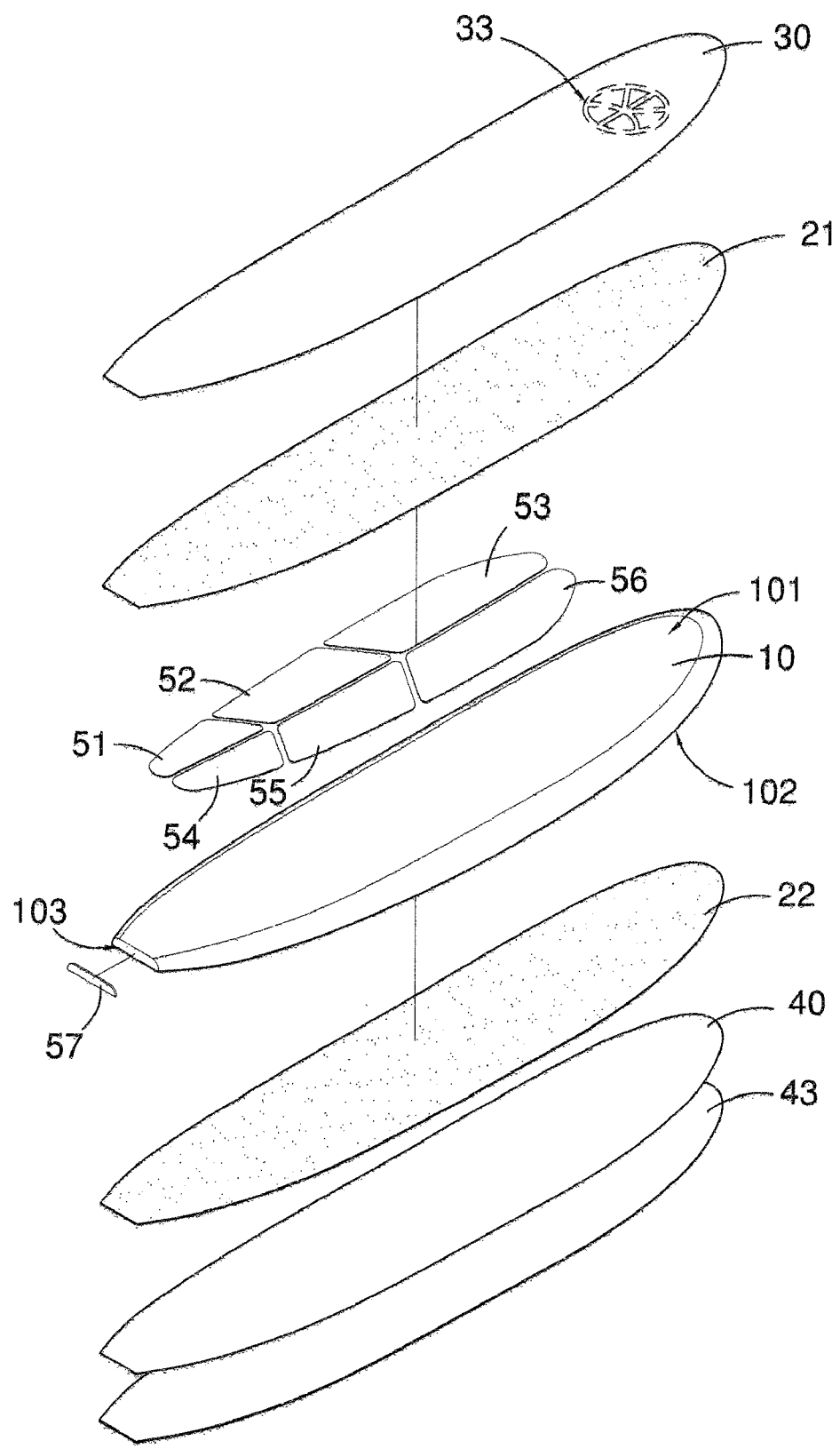
FIG. 6 is an explosive view of the foam product of FIG. 5.

FIG. 6, an explosive perspective view of the paddle board illustrates that the foam product includes a foam core 10, a first foam skin 21, a second foam skin 22, a first plastic film 30, six first elastic buffers 51-56, a second elastic buffer 57 and a plastic board including a second plastic film 40 and a plastic plate 43. The first plastic film 30 has a pattern visible from outside. The six first elastic buffers 51-56 are bonded to a top surface 101 of the foam core 10 while the second elastic buffer 57 is bonded to a rear side 103 of the foam core 10. Note that the pattern 33 of the first plastic film 30 is disposed in an area of the top surface of the plastic film 30. However, in other example, the pattern 33 may cover the entire top surface of the plastic film 30.

Figure 7:
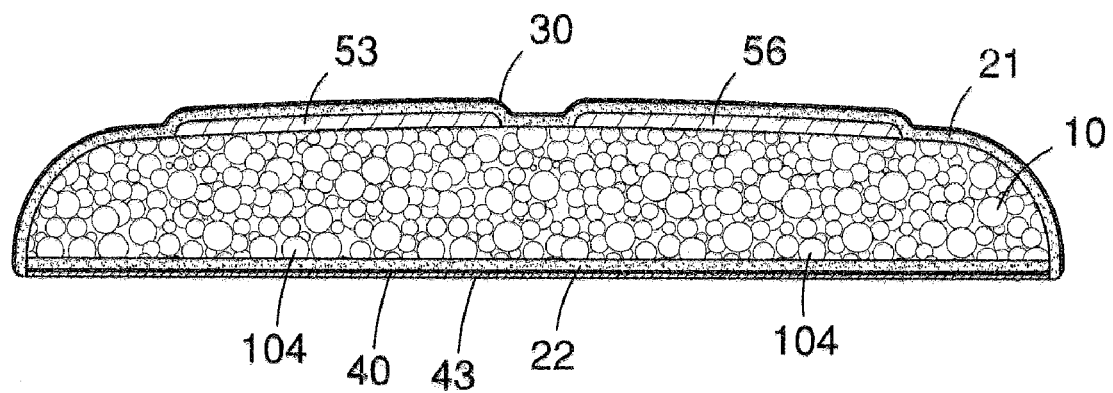
FIG. 7 is a cross-sectional view taken along line A-A of the foam product of FIG. 5.

FIG. 7 is a cross-sectional view taken along the line A-A of FIG. 5. Similar to the foam core 10 of the first embodiment, the foam core 10 of the second embodiment is composed of a plurality of foam beads 104 bonded with one another tightly. The foam beads 104 are made of foam particles, such as polypropylene (PP), polyethylene (PE), polystyrene (PS) or the like, and those foam beads 104 are pre-foamed.

The elastic buffers 51-56 of the second embodiment, similar to the foam buffer 51, 52 and 53 of the first embodiment, are made of foam materials and each is more elastic that the foam core 10. For example, the elastic buffers 51-56 may be made of PE, PP, PS, thermoplastic polyurethane elastomer (TPU) or the like. Preferably, the elastic buffers 51-56 are made of materials selected from those with physical-chemical characteristics similar to those of the foam beads 104 of the foam core 10. As shown in FIG. 5, the elastic buffers 51-56 are disposed on the predetermined areas of the top surface 101 of the foam core 10 where a user may sit or stand while paddling. By this way, the elastic buffers 51-56 can protect the foam core 10 from excessive stress and distortion over a long period of time so that the foam product is strong and endurable.

Referring back to FIGS. 5, 6 and 7, the foam core 10 is entirely encased by the first and second foam skins 21, 22. Especially, the first and second foam skins 21, 22 are sealed to each other at the edges. The foam skins 21, 22 are made of the same polyethylene foam with same density and are directly heat laminated to the foam core 10 correspondingly without an intermediate element. More specifically, the first foam skin 21, substantially formed in one piece, is fully bonded to and entirely covers top surfaces of the elastic buffers 51-56 and the other areas of the foam core 10. As shown in the drawings, each of the first elastic buffers 51-56 causes a bulge in the first foam skin. The second foam skin 22, substantially formed in one piece, is heat laminated to the bottom surface 102 of the foam core 10. Each of the polyethylene foam skins 21, 22 has a density greater than that of the foam core 10 and is in the range of 1.5 to 10 PCF. Hence the foam skins 21, 22, 23 have smoother surfaces, which improve the interfacial bonding strength during the heat lamination between the foam core 10 and the non-foam first plastic film 30.

In another example where the foam core 10 is made of non-polyethylene foam, such as polystyrene foam or polypropylene foam, and the foam skins 21, 22 and the elastic buffers 51-56 are made of polyethylene foam, the foam skins 21, 22 and the elastic buffers 51-56 are adhesively bonded to the foam core 10 via a bonding medium or an adhesive.

The first plastic film 30 together with the first foam skin 21 is partly bulged out due to the first elastic buffers 51-56. Furthermore, the first plastic film 30 together with the first foam skin 21 is embossed or cast via a mold to define a plurality of concaves 301 in an exterior surface 321 of the plastic film 30, as shown in FIG. 4 of the first embodiment. In such a manner, the bonding strength between the first plastic film 30 and the foam skin 21 is enhanced. Furthermore, the concaves 301 enable the users to grab the foam product with greater tenacity.

Referring to FIG. 6, the plastic board, which is on the bottom side of the foam core 10, is formed in one piece and is thicker than the first plastic film 30 in order to enhance wear resistance. The second plastic film 40 of the plastic board has a pattern (not shown) therein. The plastic plate 43 is laminated to a bottom surface of the second plastic film 40 to enhance wear resistance. In addition, the plastic plate 43 is made of transparent materials in order to have the pattern of the second plastic film 40 visible from outside and protected from direct exposure to the outside of environment.

As stated above, the foam core 10 as well as the patterns is protected from erosion by exposure to ultraviolet light, moisture and abrasion. Furthermore, the patterns are visible from outside of the foam product that attracts the users' attentions.

In order to enhance the bonding between the foam core 10, the elastic buffers 51-56 and the first foam skin 21, a bonding medium (not shown) may be either applied to a contact side of the first foam skin 21 or to the top surface 101 of the foam core 10 and sides of the elastic buffers 51-56. Preferably, the bonding medium is formed on the contact side of the first foam skin 21 for bonding the first foam skin 21 to the top surface 101 of the foam core 10. The elastic buffers 51-56 can further comprise additional bonding mediums to bond themselves to the foam core 10. In particular, materials of the bonding mediums are selected according to those of the foam beads 104 of the first foam core 10. In addition, the bonding mediums are made of the materials with excellent bonding ability to the foam beads 104 and the elastic buffers 51-56, such as a multi-property copolymer mixed with PE, PS or the like.

Figure 8:
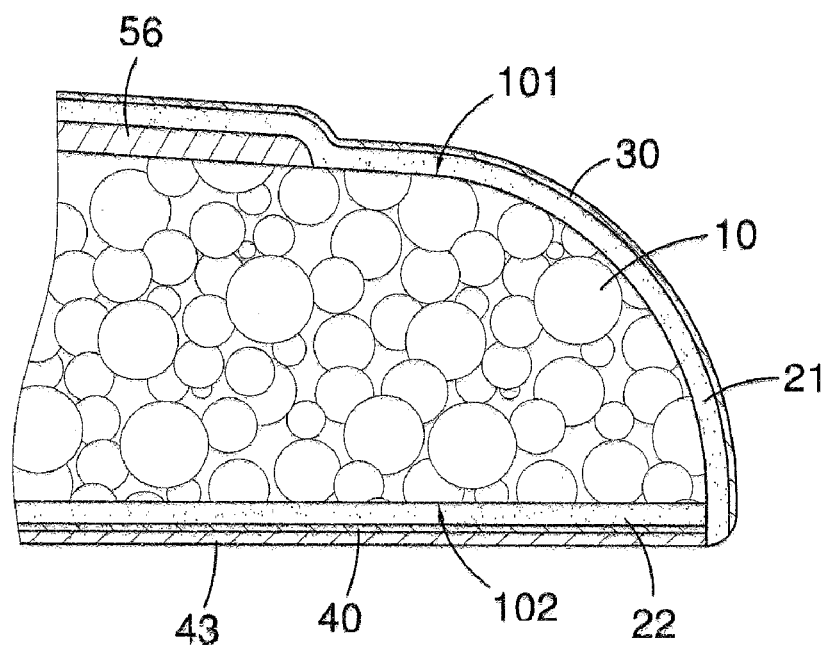
FIG. 8 is a regionally enlarged view of the foam product shown in FIG. 7.

FIG. 8, a regionally enlarged view of FIG. 7, shows that first elastic buffers 51-56 are directly disposed on the top surface 101 of the foam core 10. In practice, the foam core 10 and first elastic buffers 51-56 are formed separately in advance. Once the foam core is shaped and formed in a molding process, the first elastic buffers 56 may then be adhered or heat-laminated onto the foam core 10.

Figure 9:
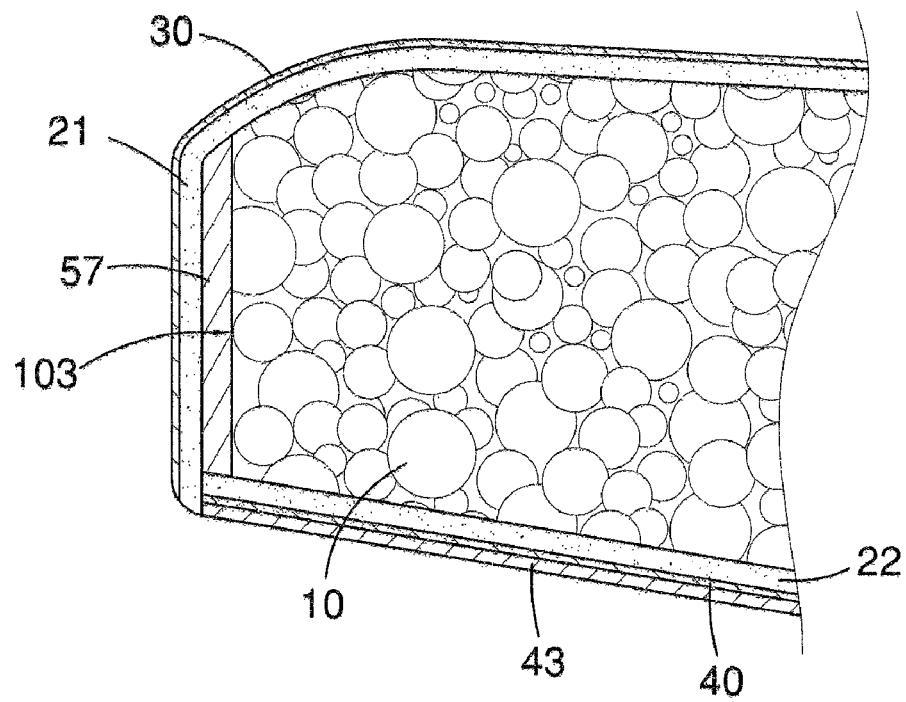
FIG. 9 is an enlarged cross-sectional view taken along line B-B of the foam product of FIG. 5.

FIG. 9 is an enlarged cross-sectional view taken along the line B-B of the foam product of FIG. 5. The second elastic buffer 57 has one surface bonded to a rear side 103 of the foam core 10 and the opposite surface bonded to the first foam skin 21. Similarly, the second elastic buffer 57 is made of foam materials and is more elastic than the foam core 10.

Figure 10:
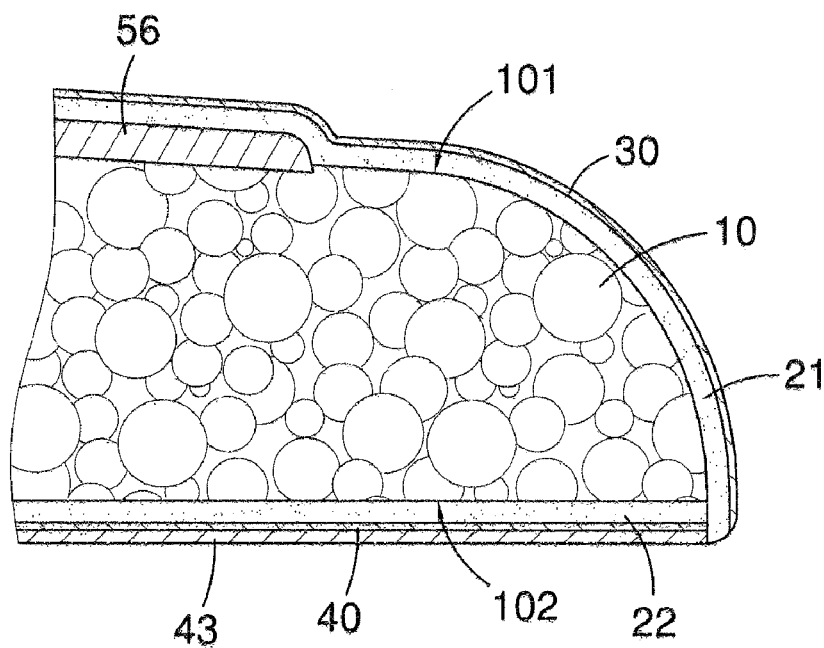
FIG. 10 is a regionally enlarged cross-sectional view of a foam product according to a third embodiment of the present invention.

FIG. 10 is a regionally enlarged cross-sectional view of a foam product according to a third embodiment of the present invention. The third embodiment is extremely similar to the second embodiment except that each of the first elastic buffers 51-56 of the third embodiment are slightly sunk in the foam core 10, as shown in FIG. 10 where only the first elastic buffer 56 is shown. This is because the third embodiment is made in a different method. As mentioned above, the first elastic buffer 56 and the foam core 10 of the second embodiment are adhered to each other after the foam core 10 is formed and shaped. How ever, in the third embodiment, the first elastic buffer 56 and the foam core 10 are formed together in a molding process as follows. First, the first elastic buffer 56 is placed in a concave defined in a wall of a mold and the pre-foamed foam beads 104 are loaded into the mold. After heat treatment during the molding process, the first elastic buffer 56 is tightly joined with the top surface 101 of the foam core 10. Besides, since the thickness of the first elastic buffer 56 may be a little higher than the depth of the concave of the mold, the first elastic buffer 56 may have its bottom slightly covered by or sunk in the foam core 10 after the molding, as shown in FIG. 10.

The foregoing description is for purposes of illustration only and is not intended to limit the scope of the protection accorded this invention. The scope of protection is to be measured by the following claims, which should be interpreted as broadly as the inventive contribution permits.

The invention claimed is:

1. A foam product comprising:
a foam core defining at least one first area and a second area on a top surface thereof;
a first elastic buffer with a bottom surface bonded to the first area of the top surface of the foam core; and
a first foam skin with a bottom surface partly bonded to a top surface of the first elastic buffer and partly bonded to the second area of the top surface of the foam core.

2. The foam product of claim 1, wherein the first elastic buffer is made of foam materials and is more elastic than the foam core.

3. The foam product of claim 2, wherein the first elastic buffer causes a bulge in the first foam skin.

4. The foam product of claim 3, wherein the first foam skin and the first elastic buffer are made of polyethylene foam; and the foam core is made of polystyrene foam.

5. The foam product of claim 3, wherein the first elastic buffer is partly sunk in the foam core.

6. The foam product of claim 1 further comprising a second elastic buffer having one surface bonded to a rear side of the foam core and the opposite surface bonded to the first foam skin.

7. The foam product of claim 2 further comprising a second elastic buffer having one surface bonded to a rear side of the foam core and the opposite surface bonded to the first foam skin; wherein the second elastic buffer is made of foam materials and is more elastic than the foam core.

8. The foam product of claim 3 further comprising a plastic film and a bottom surface bonded to a top surface of the first foam skin, wherein the plastic film together with the first foam skin is partly bulged out due to the first elastic buffer.

9. The foam product of claim 8 further comprising:
a second foam skin having a top surface bonded to a bottom surface of the foam core; and
a plastic board having a top surface bonded to a bottom surface of the second foam skin and being thicker than the plastic film.

10. The foam product of claim 9, wherein each of the first foam skin, the second foam skin, the plastic film and the plastic board is made in one piece; and the first and second foam skins are sealed to each other at the edges.

11. A foam product comprising:
a foam core;
at least one elastic buffer with a bottom surface bonded to an area of a surface of the foam core; and a first foam skin with a bottom surface partly bonded to a top surface of the elastic buffer and partly bonded to other area of the surface of the foam core;

wherein the elastic buffer is made of foam materials and causes a bulge in the first foam skin.

12. The foam product of claim 11, wherein the first foam skin and the elastic buffer are made of polyethylene foam; the foam core is made of polystyrene foam; and the elastic buffer is more elastic than the foam core.

13. The foam product of claim 12 further comprising:

a plastic film having a bottom surface bonded to a top surface of the first foam skin;

a second foam skin having a top surface bonded to a bottom surface of the foam core; and a plastic board having a top surface bonded to a bottom surface of the second foam skin and being thicker than the plastic film.

14. The foam product of claim 13, wherein each of the first foam skin, the second foam skin, the plastic film and the plastic board is made in one piece; and the first and second foam skins are sealed to each other at their edges.

15. The foam product of claim 8, wherein the plastic film has a pattern visible from outside.

16. The foam product of claim 13, wherein the plastic film has a pattern visible from outside.

* * * * *